United States Patent [19]

Shuert

[11] Patent Number: 5,658,523

[45] Date of Patent: Aug. 19, 1997

[54] METHOD AND APPARATUS FOR FORMING TWIN SHEET HOLLOW PLASTIC ARTICLES

[76] Inventor: Lyle H. Shuert, 1034 Stratford Pl., Bloomfield Hills, Mich. 48303

[21] Appl. No.: 471,765

[22] Filed: Jun. 6, 1995

[51] Int. Cl.⁶ .................................................. B29C 51/10
[52] U.S. Cl. ........................................... 264/345; 425/388
[58] Field of Search ........................... 264/545; 425/388, 425/504; 156/245, 285, 292

[56] References Cited

U.S. PATENT DOCUMENTS

| | | |
|---|---|---|
| 2,670,501 | 3/1954 | Michiels . |
| 3,250,660 | 5/1966 | Greig et al. . |
| 3,539,416 | 11/1970 | Sanders et al. . |
| 3,854,860 | 12/1974 | Haag . |
| 3,867,088 | 2/1975 | Brown et al. . |
| 3,868,209 | 2/1975 | Howell ................................ 264/545 |
| 3,925,140 | 12/1975 | Brown ................................. 159/359 |
| 4,039,643 | 8/1977 | Dean et al. . |
| 4,879,956 | 11/1989 | Shuert . |
| 5,108,529 | 4/1992 | Shuert . |

Primary Examiner—Catherine Timm
Attorney, Agent, or Firm—Young & Basile, P.C.

[57] ABSTRACT

A method and apparatus for forming twin sheet hollow plastic articles such as plastic pallets. A pair of plastic sheets is delivered directly from an extruder and loaded directly into a pair of clamping frames. The sheets are then moved in the clamping frames into an oven where the sheets are heated, whereafter the sheets are transferred to a hot forming station where the sheets are formed into a pallet. This pallet is then transferred to a cold forming station where further processing of the pallet takes place, and then to an unloading station where the finished pallet is removed and a new set of plastic sheets from the extruder is loaded into the clamping frames. At the hot forming station the sheets are delivered in side by side relation on the sheet plane with one sheet overlying a female mold and the other sheet underlying a male mold, the sheets are molded respectively and simultaneously to the male and female molds, the female mold is shifted laterally to a position underlying the male mold, and the molds are brought together to fuse selected portions on the sheet carried by the male mold to selected portions on the sheet carried by the female mold to form the twin sheet pallet. The cold forming station includes male and female molds, corresponding generally to the male and female molds of the hot forming station, which reengage the pallet and provide further forming and curing of the pallet as a new pallet is formed at the hot forming station utilizing a new set of plastic sheets.

9 Claims, 5 Drawing Sheets

METHOD AND APPARATUS FOR FORMING TWIN SHEET HOLLOW PLASTIC ARTICLES

BACKGROUND OF THE INVENTION

This invention relates to the formation of twin sheet hollow plastic articles, and more particularly to the formation of twin sheet plastic pallets.

Pallets have traditionally been formed of wood. Wood pallets however have many disadvantages. For example, they are subject to breakage and thus are not reusable over an extended period of time. Wood pallets also take up a considerable amount of valuable space in the warehouse when they are not in use. In an effort to solve some of the problems associated with wood pallets, plastic pallets have been developed and employed with varying degrees of success. One form of highly successful plastic pallet embodies a twin sheet construction in which an upper plastic sheet is thermal formed over a male mold having downwardly extending leg protrusions, a lower plastic sheet is thermal formed over a female mold having leg cavities complemental to the leg protrusions on the male mold, and the sheets are selectively fused together with the hollow leg protrusions of the upper sheet nested in the hollow leg cavities of the lower sheet to form a plastic pallet having a generally planar platform structure and a plurality of spaced hollow fused legs extending downwardly from the platform structure and opening in the upper face of the platform structure.

Whereas this twin sheet pallet has been highly successful and has been widely commercialized, this pallet is significantly more expensive than a comparable wooden pallet.

SUMMARY OF THE INVENTION

This invention is directed to the provision of an improved method and apparatus for forming a twin sheet plastic article.

More specifically, this invention is directed to the provision of an improved method and apparatus for forming a twin sheet plastic pallet.

Yet more specifically, this invention is directed to the provision of method and apparatus for reducing the cost of a twin sheet plastic pallet.

According to the invention methodology, first and second plastic sheets are provided; the sheets are heated; a lower first mold is provided; an upper second mold is provided disposed laterally of and above the first mold; the first sheet is positioned above the first mold and the second sheet is positioned beneath the second mold; the first and second sheets are molded to the first and second molds respectively; the molds are shifted laterally to position the molds in vertically aligned and vertically spaced relation; and the molds are subjected to relative vertical movement to bring the molds together and fuse selected areas on the first sheet to selected areas on the second sheet and form the hollow twin sheet plastic article. This basic methodology significantly reduces the time required to form each article, thereby reducing the cost of each article; shortens the time between forming of the sheets to the molds and knitting of the sheets, thereby allowing the use of lighter gage sheets and further reducing the cost of each article; and provides better access to each mold so as to facilitate ancillary operations such as plug assist and the incorporation of inserts such as steel beams.

According to a further feature of the invention methodology, a heating station is also provided and the sheets are heated at the heating station and are thereafter moved to the forming station for molding by the first and second molds. This methodology further facilitates the rapid and efficient formation of the articles.

According to a further feature of the invention methodology, the sheets are moved into the forming station in side-by-side relation and lying in a common generally horizontal sheet plane. This specific methodology for moving the sheets further facilitates the rapid formation of the articles.

According to a further feature of the invention methodology, the lower first mold comprises a female mold; the upper second mold comprises a male mold having a molding surface complementary to the molding surface of the female mold; the molding of the first and second sheets to the first and second molds occurs generally at the sheet plane; and, following the molding operation, one of the molds, together with the sheet molded thereto, is moved vertically away from the sheet plane and thereafter moved laterally to bring the molds into vertically aligned and vertically spaced relation. This specific relative movement of the molds contributes importantly to the time saving aspect of the invention methodology.

According to a further feature of the invention methodology, the second upper mold is positioned on a lower face of an upper platen; the first lower mold is positioned on an upper face of a lower platen; the relative vertical movement of the molds is achieved by relative vertical movement of the platens; and a preform is provided positioned on the lower face of the upper platen over the first lower mold to assist in the molding of the first sheet to the first mold. This specific arrangement facilitates the efficient molding of the first sheet to the first mold.

According to a further feature of the invention methodology, a plug assist is provided; the plug assist is positioned beneath the second upper mold during the molding of the second sheet to the second upper mold to assist in the molding operation; the shifting of the molds laterally comprises moving the first lower mold laterally into a position beneath the second upper mold; and the plug assist is moved out of its position beneath the upper second mold prior to the arrival of the first lower mold at this position. This relative timing and shifting of the lower mold and plug assist further facilitates the time saving aspect of the invention methodology.

According to a further feature to the invention methodology, a slide structure is provided on the upper face of the lower platen; the first lower mold is positioned on the slide structure; and the shifting of the molds laterally comprises sliding the first lower mold on the slide structure laterally into a position beneath the second upper mold. This specific structure facilitates the shifting of the lower mold and thereby optimizes the basic invention methodology.

A further methodology provided by the invention includes providing a heating station; providing a hot forming station having first and second coacting molds; providing a cold forming station having first and second coacting molds; providing first and second plastic sheets; heating the sheets at the heating station; thereafter moving the sheets to the hot forming station; molding the first and second sheets at the hot forming station to the first and second hot forming molds respectively; bringing the hot forming molds together to selectively fuse the first and second sheets together and form a twin sheet hollow plastic article; thereafter opening the first and second hot forming molds and moving the article to the cold forming station; and moving the first and second cold forming molds together at the cold forming station to reengage the first and second sheets and continue and complete the processing operation begun at the hot forming station. This combination of a hot forming station and a subsequent cold forming station allows the time required for proper formation of the article to be divided between two stations and, more specifically, allows the use of desirable hotter mold temperatures without lengthening the cycle time since the longer cool down cycle time that results inherently from the higher mold temperatures may take place primarily at the cold forming station.

According to a further feature of this aspect of the invention methodology, the hollow plastic article comprises a first hollow plastic article; as the first hollow plastic article is being moved from the hot forming station to the cold forming station a second set of first and second sheets is moved into the hot forming station for formation into a second hollow plastic article; and the first hollow plastic article is held in the cold forming station during the time required to form the second hollow plastic article at the hot forming station. With this specific invention methodology the formation of one article is being completed at the cold forming station at the same time that the initial formation of the next succeeding article is occurring at the hot forming station.

According to a further methodology of the invention, a molding apparatus is provided having a loading station, a heating station, a forming station and an unloading station; an extruder is provided capable of providing a continuous extruded plastic web at a discharge end of the extruder; the discharge end of the extruder is positioned proximate the loading station of the molding apparatus; the extruded plastic material leaving the extruder is cut into individual sheets and delivered to the loading station; and the sheets are moved successively through the heating, forming and unloading stations to form successive plastic articles. This specific methodology, whereby the extruder and the molding apparatus coact to define a continuous article formation procedure, reduces the energy requirements of the system and thereby further reduces the cost of producing each individual article.

According to a further feature of this aspect of the invention methodology, the method comprises a method for forming a hollow twin sheet plastic article; a pair of plastic sheets is delivered from the extruder to the loading station and loaded into the molded apparatus in side-by-side relation; the sheets are thereafter moved in side-by-side relation to the heating station; and the sheets are thereafter moved in side-by-side relation to the forming station whereat they are formed into a hollow twin sheet plastic article.

According to one feature of the invention apparatus, the apparatus includes an oven; a hot forming station; a cold forming station; means operative to deliver first and second sheets to the oven for heating and thereafter to the hot forming station; means at the hot forming station, including coacting molds, operative to form the first and second sheets into a hollow plastic article having a configuration corresponding to the configuration of the coacting molds and thereafter release the article; means operative to deliver the released hollow plastic article from the hot forming station to the cold forming station; and means at the cold forming station, including coacting molds corresponding generally to the coacting molds at the hot forming station, operative to reengage the hollow plastic article. This arrangement allows the time required to complete each article to be split between time spent in the hot forming station and time spent in the cold forming station and thereby reduce the machine time required to produce each article. More specifically, this arrangement allows the use of desirable hotter mold temperatures without lengthening the total cycle time since the longer cool down cycle time that results inherently from the higher mold temperatures may take place primarily at the cold forming station.

According to a further feature of this aspect of the invention apparatus, the delivery means is operative to deliver successive sets of first and second sheets to the oven and thereafter to the hot forming station and is operative to deliver successive hollow plastic articles formed at the hot forming station to the cold forming station; and the apparatus further includes timing means operative to maintain each hollow plastic article in engagement with the coacting molds at the cold forming station during the time required to form the next successive hollow plastic article at the hot forming station.

According to a further feature of the invention apparatus, the hot forming station includes a first mold; a second mold; vertical drive means operative to impart relative vertical movement to the molds; molding means operative to mold the first sheet to the first mold and the second sheet to the second mold in response to relative vertical movement of the molds; and horizontal drive means operative to move the first mold between a first position laterally disposed relative to the second mold and a second position in vertical alignment with the second mold. This specific arrangement facilitates the desired lateral shifting of the mold.

According to a further feature of this aspect of the invention apparatus, the second mold is positioned above the first mold and the delivery means is operative to move the first and second sheets into the hot forming station in side-by-side relation and lying in a common generally horizontal plane with the first sheet positioned above the first mold and the second sheet positioned below the second mold.

According to a further feature of this aspect of the invention apparatus, the molding of the first and second sheets to the first and second molds occurs generally at the sheet plane and, following the molding operation, the first mold, together with the first sheet molded thereto, is moved vertical away from the sheet plane by the vertical drive means and is thereafter moved laterally by the horizontal drive means to a position in vertical alignment with the second mold.

According to a further feature of this aspect of the invention apparatus, the first mold is a lower female mold; the second mold is an upper male mold having a molding surface corresponding to the molding surface of the lower mold; the movement of the first mold away from the sheet plane is a downward movement; the lateral movement of the first mold disposes the second mold below the first mold; and the first mold is thereafter moved upwardly to fuse selected areas on the first sheet, carried by the first mold, to selected areas on the second sheet, carried by the second mold, to thereby form a hollow twin sheet plastic article.

According to a further respect of the invention apparatus, the apparatus includes a loading station, a heating station, a forming station, an unloading station, an extruder having a discharge end positioned proximate the loading station whereby to deliver a continuous extruded plastic web to the vicinity of the loading station; a cutter positioned between the extruder discharge end and the loading station operative to sever the web into individual sheets; delivery means operative to deliver the severed individual sheets to the loading station; and feeder means operative to move the sheets successively through the heating, forming and unloading stations to form successive plastic articles. This arrangement allows a rapid, continuous and efficient formation of plastic articles.

According to a further feature of this aspect of the invention apparatus, the apparatus is for forming hollow twin sheet plastic articles; the delivery means is operative to deliver a pair of plastic sheets to the loading station in side-by-side relation; and the feeder means is operative to move the sheets in side-by-side relation to the heater station and to thereafter move the heated sheets in side-by-side relation to the forming station where they are formed into a hollow twin sheet plastic article.

BRIEF DESCRIPTION OF THE INVENTION

DETAILED DESCRIPTION OF THE PREFERRED EMBODIMENT

The invention molding apparatus 10, broadly considered, includes an extruder assembly 12 and a rotary molding apparatus 14.

Extruder assembly 12 includes an extruder 16, a guillotine 18 and delivery means 20.

Extruder 16 is of known form and includes a hopper 16a for delivery of raw material and a main body 16b configured to extrude parallel continuous webs of plastic material 16c and 16d.

Guillotine 18 comprises a knife positioned in overlying relation to the path of the extruder web 16c, 16d and operative in known manner to periodically sever the web 16c, 16d so as to form individual sheets 22 and Delivery means 20 comprises, for example, a series of power rollers arranged to receive the sheets 22,24 after they have been severed by the knife 18 and move the sheets forwardly in parallel fashion.

Rotary molding apparatus 14 comprises a multi-station rotary device including a wheel assembly 26, a load/unload station 28, a heating station 30, a hot forming station 32 and a cold forming station Wheel assembly 26 includes a central hub 36 powered by a central drive shaft 37, a plurality of circumferentially spaced spider arms 38 extending radially outwardly from the hub 36, and a pair of frame structures 40, 42 positioned at the free end of each arm 48.

Frame structures 40,42 are shown schematically and are arranged in known manner to receive respective plastic sheets 22,24. Each frame structure is movable in known manner between a clamping position engaging and gripping the total periphery of the sheet and an open position in which the sheet is released.

It will be seen that there are four arms 38 spaced at approximately 90° intervals and four sets of frame structures 40, 42.

Load/unload station 28 is positioned on the centerline 43 of the extruder and is essentially defined by the frame structures 40, 42 instantaneously positioned at the load/unload station.

Heating station 30 is of known form and comprises an oven 46 including a suitable heat source (such for example as a radiant heater) arranged to generate heat to heat sheets 22,24 delivered sequentially to the oven by the clamp frame assembly 26. If the load/unload station is considered to be at a 12:00 o'clock position, then the oven or heating station may be, for example, at an approximately 3:00 o'clock position.

Hot forming station 32 occupies an approximately 6:00 o'clock position as compared to the load/unload station and the heating station and includes an upper platen 48, a male mold 50, a preform 52, a lower platen 54, a female mold 56, and a plug assist 58.

Upper platen 48 is mounted for vertical movement via a power source, such for example as a hydraulic ram 60.

Figure 8:
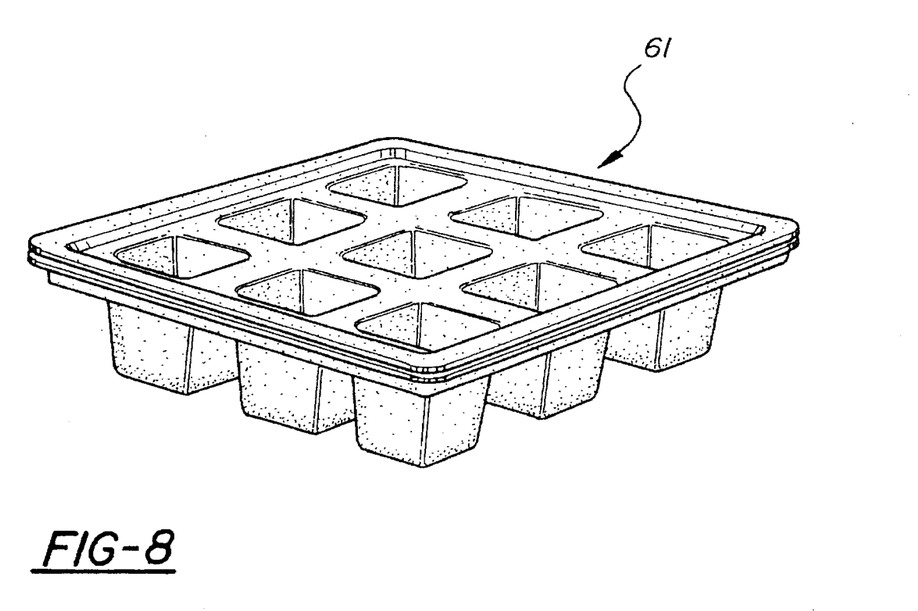
FIG. 8 is a perspective view of a twin sheet plastic pallet formed in accordance with the invention apparatus and methodology.

Male mold 50 is secured to the underface 48a of upper platen 48 and defines a male molding surface 50a having a configuration corresponding to the upper face of the plastic article being formed. For example, in the case of a plastic pallet 61 as seen in FIG. 8, molding surface 50a defines a pattern of nine downwardly extending legs with three legs along each side of the mold and a central leg.

Preform 52 is secured to the underface 48a of the upper platen in side-by-side laterally displaced relation with respect to male mold 50. Preform 52 defines a molding surface 52a configured to coact in known manner with female mold 56.

Lower platen 54 is positioned in vertically spaced relation below upper platen 48 and includes means such as a hydraulic ram 62 for moving the lower platen 54 vertically toward and away from the upper platen in known manner. Lower platen 54 includes a main body portion 54a and a plurality of rails 54b positioned side by side on the top of main body portion 54a to define a slide structure.

Female mold 56 is positioned on top of rails 54b and is slidably movable laterally along the rails 54b by a suitable power means such for example as a hydraulic ram 64. Female mold 56 defines the bottom surface of the plastic article being formed and, in the case of the illustrated plastic pallet 61, defines a molding surface including nine cavities corresponding to and complementary to the nine legs defined by the male molding surface 50a.

Plug assist 58 is supported for example on a platform 66 and is mounted for movement via power means such as a hydraulic ram 68 from a standby position supported on platform 66 to a working position in overlying relation to rails 54b and in underlying relation to male mold 50. The plug assist is also movable up and down, independent of the vertical movement of the platens 48 and 54, via power means such as a hydraulic ram 70.

Cold forming station 34, which is located at an approximately 9:00 o'clock position with respect to the load/unload station at a 12:00 o'clock position, the heating station at a 3:00 o'clock position, and the hot forming station at a 6:00 o'clock position, includes a male mold 72 corresponding to the male mold 50, a female mold 74 corresponding to the female mold 56, and a suitable enclosure 76. Hydraulic rams 78 and 80 are provided to move the male and female molds, respectively, in a vertical direction.

Figure 3:
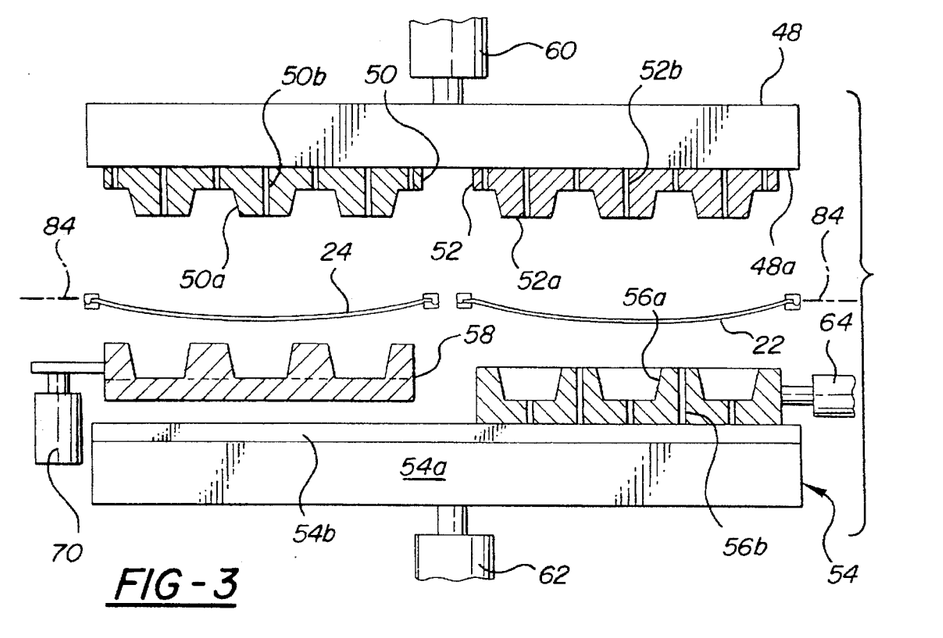
FIG. 3 is a detail view of hot forming station of the invention apparatus.
Figure 4:
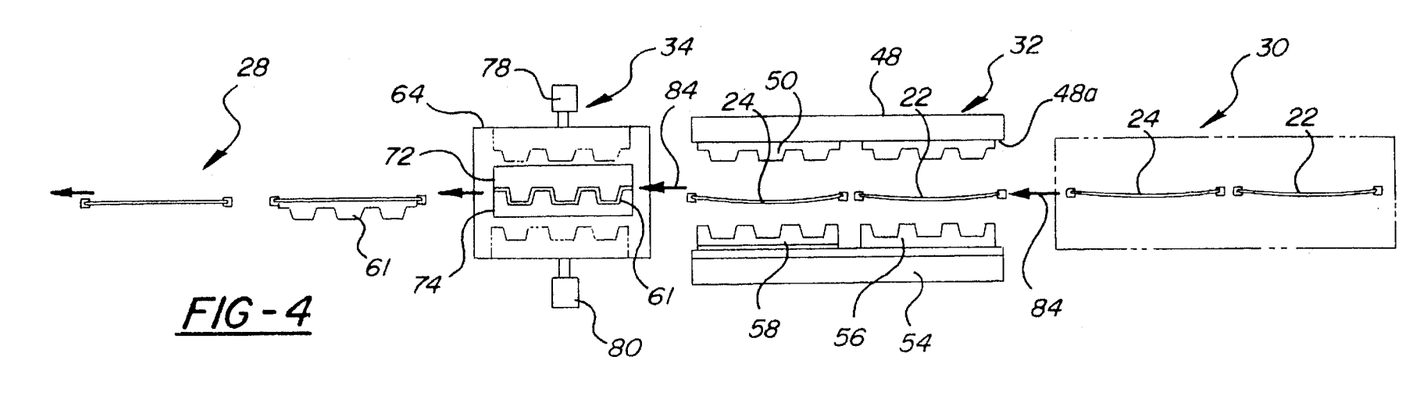
FIG. 4 is a schematic, developed side elevational view showing the various stations of the invention apparatus.

As an overview of the operation of the invention molding apparatus, a set of sheets 22 and 24 is delivered from the extruder assembly for receipt in the clamp frames 40 and 42 positioned at the load/unload station 28; the wheel assembly 26 is indexed to the 3:00 o'clock position whereby to position the sheets 22,24 in the oven 46; after the sheets have been heated to a point where they are soft and readily moldable and assume a sagging catenary configuration as best seen in FIG. 3, the wheel assembly is indexed to a 6:00 o'clock position to position the sheets 22 and 24 in overlying relation to female mold 56 and underlying relation to male mold 50, respectively; the sheets 22 and 24 are formed at the hot forming station into a twin sheet plastic pallet 61; the wheel assembly is indexed to a 9:00 o'clock position to position the pallet 61 at cold forming station 34 where the molds 72 and 74 coact to complete the processing of the pallet; and the wheel assembly is thereafter indexed back to the 12:00 o'clock position where the completed pallet 61 is unloaded from the frame 42 and a new set of extruded, severed sheets 22 and 24 is loaded into the frames 40 and 42 respectively for subsequent formation into a twin sheet pallet in the manner just described.

It will be understood that the rotary molding apparatus 14 operates in a continuous manner so that, at a given stop in the indexing movement of the clamp frame assembly, a finished pallet 61 is unloaded from the frame 42 positioned at the load/unload station and a new set of sheets 22,24 is loaded into the frames 40,42 positioned at the load/unload station; a set of sheets 22,24 is positioned in the oven 46 so as to be heated for subsequent forming in the hot and cold forming stations; a set of sheets 22 and 24 is undergoing hot forming at the hot forming station 32; and a hot formed pallet 61 is undergoing cold processing at the cold forming station 34. Thus, with each indexing movement of the clamp frame assembly 26, a finished pallet 61 is delivered to the load/unload station.

The operation of the hot forming station 32 to form a set of heated sheets 22,24 into a pallet 61 will now be described. With the upper and lower platens 48,54 in a raised and lowered position, respectively, female mold 56 in a position beneath preform 52, and plug assist 58 positioned between the platens in underlying relation to male mold 50, a set of heated sheets 22,24 from oven 46 is indexed to the hot forming station 32 with the sheets lying on the sheet line 87 in side-by-side relation, sheet 22 positioned in overlying relation to female mold 56, and sheet 24 positioned in underlying relation to male mold 50. Upper platen 48 is now lowered and lower platen 54 is raised to mold sheet 22 to the molding face 56a of female mold 56 and simultaneously mold sheet 24 to the molding face 50a of male mold 50.

Figure 6:
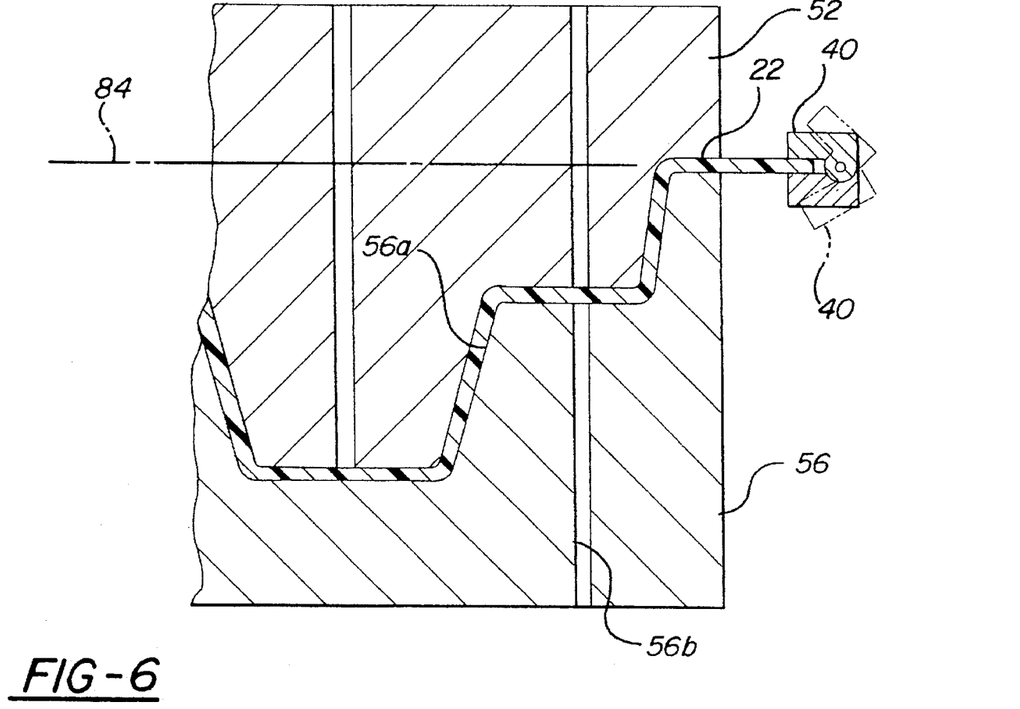

Specifically, with respect to the forming of sheet 22 to the female mold 56, upper platen 48 is lowered toward sheet 22 until an outer peripheral surface of the molding surface 52a of the preform forms a seal with the upper face of the sheet whereafter vacuum is applied to the molding surface 52a via conduits 52b to suck the sheet 22 into partial conformity with the surface 52a whereafter, as the upper face 56a of female mold 56 moves upwardly into contact with the lower face of sheet 22 in response to upward movement of lower platen 54, the vacuum on the molding face 52a is released and vacuum is applied to molding face 56a via conduits 56b whereby to suck the sheet 22 into close conformity with molding surface 56a as the upper and lower platens reach their effective lowered and raised positions to form the sheet 22 to the molding surface 56a of the female mold at the sheet line 84. The conformation of the sheet 22 at this time relative to mold 56 is best seen in FIG. 6.

Figure 2:
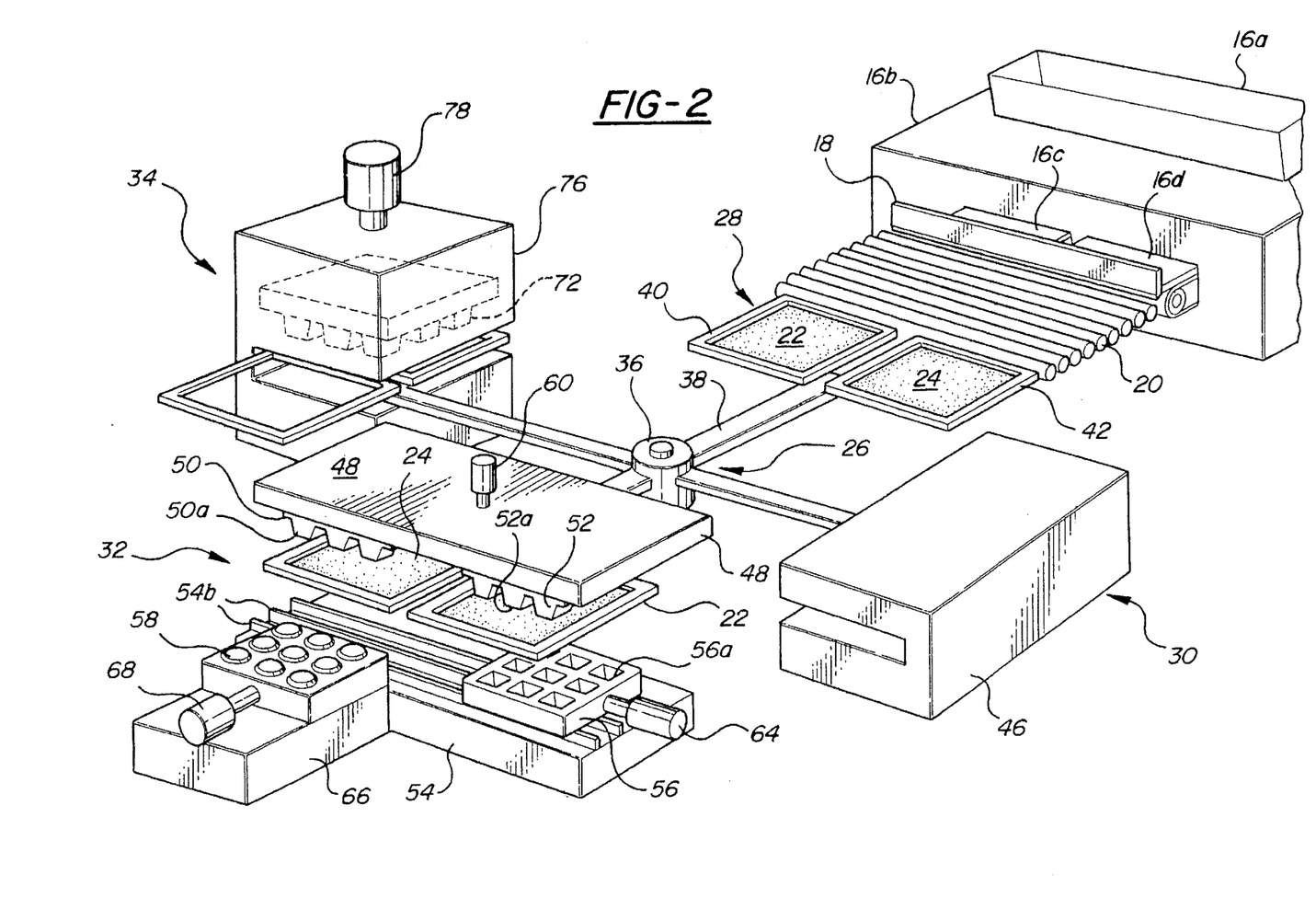
FIG. 2 is a perspective somewhat schematic view of the invention apparatus.
Figure 5:
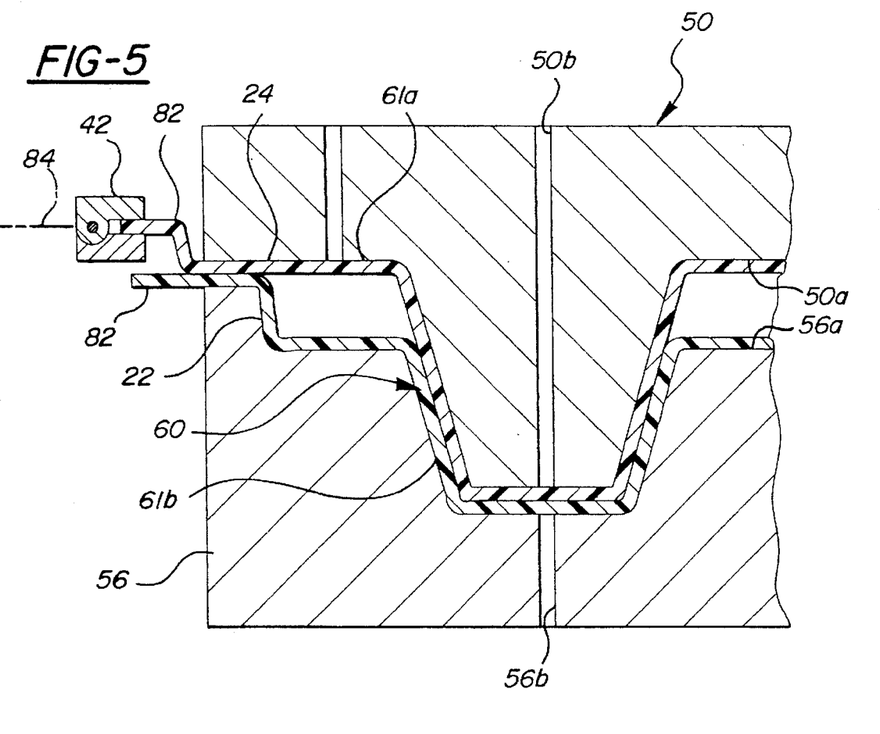
FIGS. 5 and 6 are fragmentary detail views showing specific aspects of the invention methodology.

With respect to the sheet 24, as plug assist 58 is moved upwardly by ram 70 in consort with the upward movement of lower platen 54, the upper surface of the plug assist encounters the lower face of the sheet 24 and, as the male mold 50 arrives proximate the upper face of the sheet 24 in response to downward movement of the upper platen 48, plug assist 58 moves selected portions of the sheet 24 into the pocket areas defined by the male molding surface 50a whereafter vacuum is applied to molding surface 50a via vacuum ports 50b so as to suck sheet 24 into precise conformity with molding surface 50a as the upper and lower platens reach their lowered and raised positions respectively so that the sheet 24 is formed to the molding surface 50a on the sheet line 84 simultaneously with the formation of the sheet 22 to the molding surface 56a on the sheet line 84. As soon as the sheets 22, 24 have been formed to the molding faces 56a, 50a of the female and male molds respectively, the clamp frame 40 holding the sheet 22 is released (FIG. 6) and the lower platen 54 is lowered to lower the female mold 56 and with it the sheet 22 carried by the female mold. As the lower platen 54 is lowered plug assist 58 is lowered by ram 70 independently of but in coordination with the lowering movement of the lower platen and is then drawn outwardly, utilizing ram 68, to the position seen in FIG. 2 whereafter, following the arrival of the lower platen at its lowered position, ram 64 is actuated to slide female mold 56 together with sheet 22 along rails 54b to a position underlying male mold 50 whereafter lower platen 54 is raised to move female mold 56 upwardly to move selected areas on the upper face of sheet 22 into contact with selected areas on the lower face of sheet 24 and fuse or knit the selected areas together by virtue of the heated, softened configuration of the sheets and form the pallet 61. The selective fusion of the lower sheet 22 to the upper sheet 24 to form the pallet is best seen in FIG. 5. The vacuum is now released on male molding surface 50a and female molding surface 56a.

After a suitable period of hot curing time, upper platen 48 is raised to raise male mold 50 and preform 52, and lower platen 54 is lowered to lower female mold 56. Clamp frame 42 now supports the molded pallet 61 by virtue of its continued gripping of the peripheral edge of sheet 24. Female mold 56 is now moved laterally by ram 64 to its original position underlying preform 52, and plug assist 58 is reinserted into its position underlying the male mold by ram 68. At this time clamping frame assembly 26 is indexed to move the hot formed pallet 61 to the cold form station 34 and move a new set of sheets 22,24 into position between the upper and lower platens.

Figure 7:
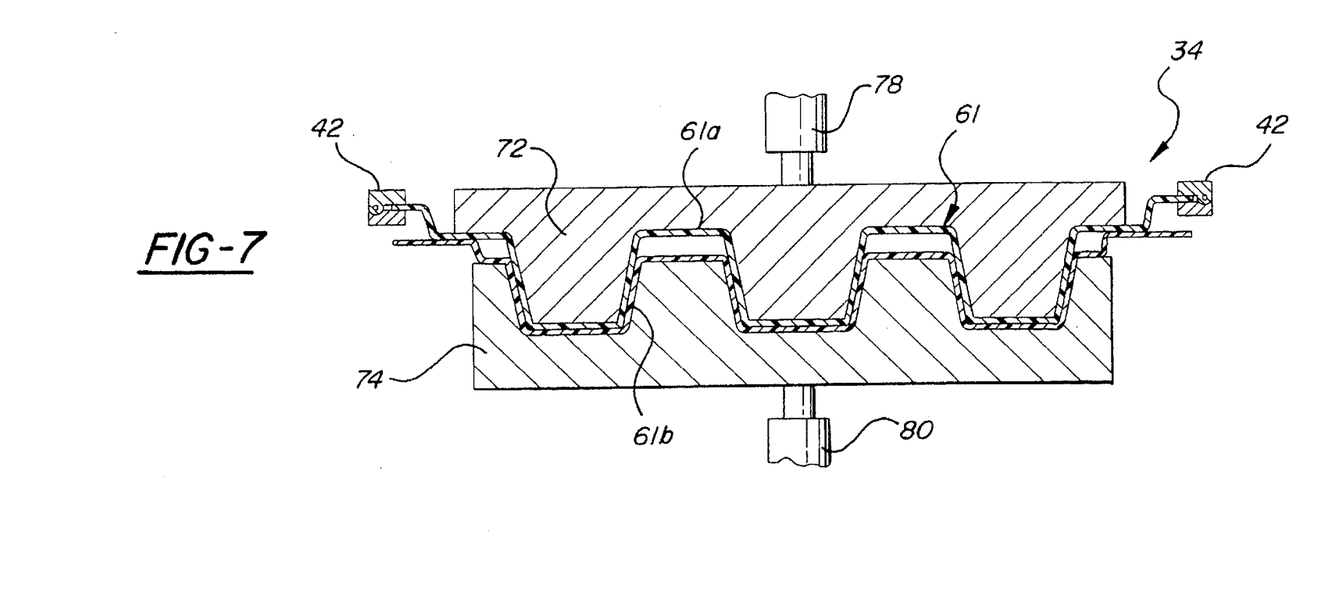
FIG. 7 is a detail view of a cold forming station of the invention apparatus.

As the pallet 61 formed at the hot forming station is indexed to the cold forming station 34 and arrives at the cold forming station (FIG. 7) male and female molds 72,74, which have been separated to allow release of the previous pallet and allow the arrival of the new pallet, move downwardly and upwardly under the respective urging of rams 78,80 to effectively clamp the upper face 61a of the pallet and the lower face 61b of the pallet, whereby to continue and complete the pallet processing operation begun at the hot forming station.

The pallet 61 remains at the cold forming station 34, clamped between the upper and lower molds 72, 74 during the time required for a new pallet to be formed from a new set of sheets 22,24 at the hot forming station and during the cure time at the hot forming station whereafter, as the newly formed pallet 61 is indexed to the cold forming station, the finished pallet 61 leaves the cold forming station and is indexed to the load/unload station 28 where the respective clamp frame 42 is opened, the finished pallet is unloaded and thereafter trimmed to remove the offal 82, and a new set of sheets 22,24 from the extruder is loaded into the clamp frames 40,42 to begin a new cycle.

Figure 1:
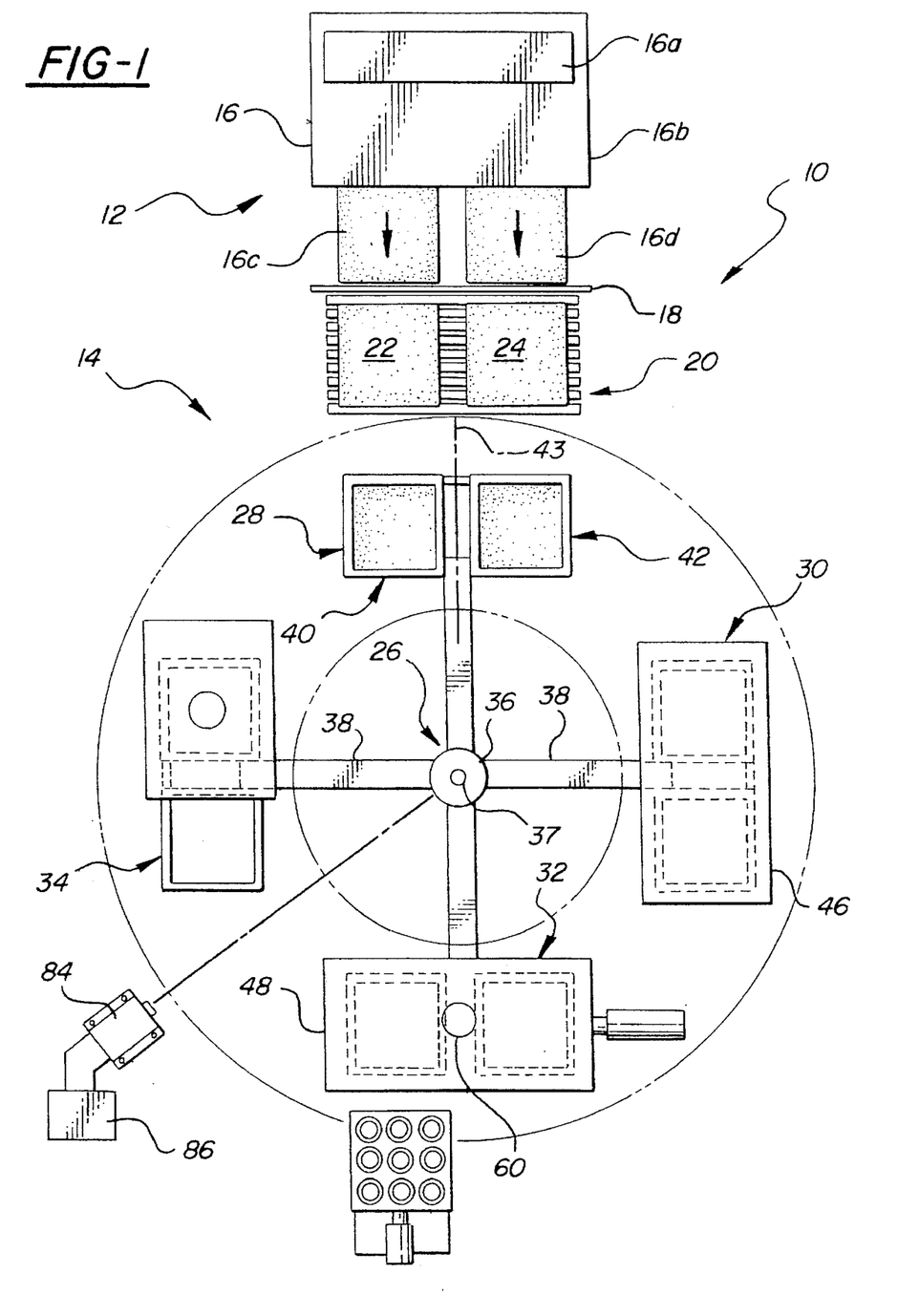
FIG. 1 is a schematic plan view illustrating the invention apparatus and methodology.

Wheel assembly 26 is preferably driven in indexing fashion by a suitable motor means 84 (FIG. 1) and the motor means 84 is in turn controlled by a suitable timer mechanism 86 which functions to control the motor 84 is a sense to determine the dwell time of the apparatus at each station. For example, timer 86 may provide a 55 second working time at each station in combination with a 5 second transfer time between stations so that the apparatus delivers a finished pallet every 60 seconds and a machine throughput of 60 pallets per hour as compared to 15–20 pallets per hour for comparable prior art methodologies.

The dwell time at each station will of course vary depending upon the nature and configuration of the article being formed as well as upon the characteristics of the plastic material utilized to form the article. In this regard, whereas various plastic materials may be used for the sheets to form the twin sheet pallet, it has been found that high density polyethylene (having for example a density of approximate 0.950 grams per cubic centimeter) provides a preferred material since, in a heated state, it readily and totally defuses itself and since it takes on heat slowly and releases heat slowly so as to be compatible with the relatively long cycle times required for forming plastic pallets utilizing the twin sheet methodology. The thicknesses of the sheets may also vary depending upon the application but a starting gauge of 0.125 millimeters has been found satisfactory for most applications.

The temperature that is maintained at the various stations will of course also vary depending upon the nature and configuration of the article being formed and the specific plastic material being utilized. For example, the oven may be set to produce a sheet temperature of 360° F.; the mold temperature at the hot forming station may be between 200° and 250° F.; and the mold temperature at the cold forming station may be between 125° and 150° F.

Although the stations 32 and 34 are respectively referred to as a hot forming station and a cold forming station, no heat will ordinarily be inputted at the hot forming station 32 or the cold forming station 34 except the heat imparted to the forming molds by the heated sheets. Cooling water is circulated around the molds at the hot forming station to extract heat from the hot forming molds and maintain the hot forming molds at the desired relatively hot temperature and cooling water is circulated around the molds at the cold forming station to extract heat from the cold forming molds and maintain the cold forming molds at the desired relatively cold temperature.

The invention apparatus and methodology will be seen to retain all of the acknowledged advantages of a twin sheet pallet while significantly reducing the cost of the pallet. Specifically, the lateral movement of the female mold relative to the male mold, after the sheets have been simultaneously formed to the male and female molds respectively, significantly reduces the overall time and cost required to form the pallet, provides a relatively short time interval between the formation of the sheets to the molds and the knitting of the sheets whereby to allow the use of lighter gage sheets and thereby further reduce the cost of the pallet, and provides better access to the molds whereby to facilitate plug assist operations and facilitate the incorporation of inserts into the pallet; the feature of the invention methodology wherein the processing time of the pallet is split between two stations, including a hot forming station where the pallet is actually formed and a subsequent cold forming station where cool down takes place, allows the use of hotter mold temperatures, and better knitting, without increasing the cool down time and thereby the overall cycle time; and the invention methodology involving an extruder feeding directly to the rotary apparatus of the molding apparatus improves the overall energy efficiency of the operation and thereby further reduces the cost of the pallet.

Whereas a preferred embodiment of the invention has been illustrated and described in detail it will be apparent that various changes will be made in the disclosed embodiment without departing from the scope or spirit of the invention.

I claim:

1. A method of forming a twin sheet plastic article comprising:

providing first and second side by side clamp frames;

positioning first and second plastic sheets in the first and second clamp frames;

heating the sheets;

providing a hot forming station including a lower first mold and an upper second mold disposed laterally of and above the first mold;

moving the first and second clamp frames with the first and second sheets positioned therein to the hot forming station to position the sheets at the hot forming station with the first sheet positioned above the first mold and the second sheet positioned beneath the second mold;

molding the first and second sheets to the first and second molds respectively;

releasing one of the sheets from its clamp frame while retaining the other sheet in its clamp frame;

shifting the molds laterally to position the molds in vertically aligned and vertically spaced relation;

subjecting the molds to relative vertical movement to bring the molds together and fuse selected areas on the first sheet to selected areas on the second sheet and form the twin sheet plastic article while retaining the other sheet in its clamp frame; and with the other sheet retained in its clamp frame and the other clamp frame empty, moving the first and second clamp frames away from the hot forming station to convey the twin sheet plastic article to a further processing station.

2. A method according to claim 1 wherein:

a heating station is provided; and the sheets are moved to the heating station in the clamp frames, are positioned by the clamp frames in side by side relation in the heating station, and are thereafter moved by the clamp frames to the hot forming station for molding by the first and second molds.

3. A method according to claim 1 wherein:

the lower first mold comprises a female mold and the upper second mold comprises a male mold having a molding surface complementary to the molding surface of the female mold.

4. A method according to claim 1 wherein:

the molding of the first and second sheets to the first and second mold occurs generally at a sheet plane; and following the molding operation one of the molds, together with the sheet molded thereto, is moved vertically away from the sheet plane and thereafter moved laterally to bring the molds into vertically aligned and vertically spaced relation.

5. A method according to claim 4 wherein:

the lower first mold comprises a female mold and the upper second mold comprises a male mold having a molding surface complementary to the molding surface of the female mold; and said one mold is the female mold and its vertical movement away from the sheet plane comprises a downward movement.

6. A method according to claim 1 wherein:

the second upper mold is positioned on a lower face of an upper platen;

the first lower mold is positioned on an upper face of a lower platen; and the relative vertical movement of the molds is achieved by relative vertical movement of the platens.

7. A method according to claim 6 wherein:

the lower mold comprises a female mold; and a preform, having a molding surface generally complementary to the molding surface of the female mold, is provided positioned on the lower face of the upper platen over the female mold to assist in the molding of the first sheet to the female mold.

8. A method according to claim 6 wherein:

a plug assist is provided;

the plug assist is positioned beneath the second upper mold during the molding of the second sheet to the second upper mold to assist in the molding operation;

the shifting of the molds laterally comprises moving the first lower mold laterally into a position beneath the second upper mold; and the plug assist is movable independently of the first lower mold and is moved out of its position beneath the upper second mold prior to the arrival of the first lower mold at this position.

9. A method according to claim 6 wherein:

a slide structure is provided on the upper face of the lower platen;

the first lower mold is positioned on the slide structure; and the shifting of the molds laterally comprises sliding the first lower mold on the slide structure laterally into a position beneath the second upper mold.

* * * * *